(12) United States Patent
Prokhorov et al.

(10) Patent No.: US 7,982,620 B2
(45) Date of Patent: Jul. 19, 2011

(54) SYSTEM AND METHOD FOR REDUCING BOREDOM WHILE DRIVING

(75) Inventors: Danil V. Prokhorov, Canton, MI (US);
Steven F. Kalik, Arlington, MA (US);
Chenna K. R. Varri, Fairfax, VA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 262 days.

(21) Appl. No.: 11/752,336

(22) Filed: May 23, 2007

(65) Prior Publication Data
US 2008/0291032 A1 Nov. 27, 2008

(51) Int. Cl.
*G08B 23/00* (2006.01)
(52) U.S. Cl. ............... 340/576; 702/108; 353/103
(58) Field of Classification Search .......... 340/576; 702/108; 353/103
See application file for complete search history.

(56) References Cited

U.S. PATENT DOCUMENTS

| | | | |
|---|---|---|---|
| 4,463,347 A | 7/1984 | Seko et al. | |
| 4,725,824 A | 2/1988 | Yoshioka | |
| 4,742,389 A * | 5/1988 | Schiffman | 348/115 |
| 4,876,594 A * | 10/1989 | Schiffman | 348/115 |
| 4,884,135 A * | 11/1989 | Schiffman | 348/115 |
| 5,012,226 A | 4/1991 | Love | |
| 5,190,096 A | 3/1993 | Taniguchi et al. | |
| 5,245,319 A | 9/1993 | Kilian | |
| 5,274,560 A | 12/1993 | LaRue | |
| 5,285,523 A | 2/1994 | Takahashi et al. | |
| 5,320,321 A | 6/1994 | Muncada | |
| 5,380,204 A | 1/1995 | Decker | |
| 5,465,079 A * | 11/1995 | Bouchard et al. | 340/576 |
| 5,499,182 A * | 3/1996 | Ousborne | 701/35 |
| 5,508,685 A | 4/1996 | Monte, Jr. | |
| 5,734,357 A | 3/1998 | Matsumoto et al. | |
| 5,760,931 A | 6/1998 | Saburi et al. | |
| 5,784,036 A | 7/1998 | Higuchi et al. | |
| 5,794,164 A | 8/1998 | Beckert et al. | |
| 5,806,018 A | 9/1998 | Smith et al. | |
| 5,812,332 A | 9/1998 | Freeman | |

(Continued)

FOREIGN PATENT DOCUMENTS

JP 06219181 8/1994

(Continued)

OTHER PUBLICATIONS

Brill, J.C., P.A. Hancock, and R.D. Gilson. "Driver Drowsiness: Is something missing?" Abstract submitted to the 2nd International Driving Symposium on Human Factors in Driver Assessment, Training, and Vehicle Design, Park City, Utah, Jul. 21-24, 2003.

(Continued)

*Primary Examiner* — George A Bugg
*Assistant Examiner* — Bradley E Thompson
(74) *Attorney, Agent, or Firm* — Gifford, Krass, Sprinkle, Anderson & Citkowski, P.C.

(57) ABSTRACT

Embodiments of the present invention include systems and methods for reducing driver boredom for the driver of a vehicle particularly for vehicle environments such as straight roads and lack of traffic that are likely to induce boredom. An example system includes an electronic circuit such as a computer, a vehicle environment monitor, a driver interface, and a driver stimulation device such as a semitransparent display.

10 Claims, 5 Drawing Sheets

U.S. PATENT DOCUMENTS

| | | | |
|---|---|---|---|
| 5,821,860 A | 10/1998 | Yokoyama et al. | |
| 5,835,008 A | 11/1998 | Colemere, Jr. | |
| 5,859,714 A | 1/1999 | Nakazawa et al. | |
| 5,870,072 A | 2/1999 | Tuli et al. | |
| 5,923,256 A | 7/1999 | Satake et al. | |
| 5,952,929 A | 9/1999 | Yasushi et al. | |
| 6,014,081 A | 1/2000 | Kojima et al. | |
| 6,067,020 A | 5/2000 | Wimmer | |
| 6,087,942 A | 7/2000 | Sleichter, III et al. | |
| 6,188,312 B1 | 2/2001 | Gotauco | |
| 6,191,694 B1 | 2/2001 | Brownlee | |
| 6,240,347 B1 * | 5/2001 | Everhart et al. | 701/36 |
| 6,249,720 B1 * | 6/2001 | Kubota et al. | 701/1 |
| 6,297,728 B1 | 10/2001 | Rippbauer et al. | |
| 6,304,187 B1 | 10/2001 | Pirim et al. | |
| 6,313,749 B1 | 11/2001 | Horne et al. | |
| 6,373,472 B1 | 4/2002 | Palalau et al. | |
| 6,532,113 B2 | 3/2003 | Aoki et al. | |
| 6,615,186 B1 | 9/2003 | Kolls | |
| 6,680,670 B2 | 1/2004 | Shinada et al. | |
| 6,794,728 B1 | 9/2004 | Kithil | |
| 6,856,820 B1 | 2/2005 | Kolls | |
| 6,903,658 B2 | 6/2005 | Kane et al. | |
| 6,909,947 B2 * | 6/2005 | Douros et al. | 701/29 |
| 6,919,866 B2 | 7/2005 | Kanevsky et al. | |
| 6,925,425 B2 * | 8/2005 | Remboski et al. | 702/188 |
| 6,950,027 B2 | 9/2005 | Banas | |
| 6,968,311 B2 * | 11/2005 | Knockeart et al. | 704/270 |
| 6,985,079 B1 | 1/2006 | Pinter et al. | |
| 6,995,663 B2 | 2/2006 | Geisler et al. | |
| 6,998,972 B2 | 2/2006 | Geisler et al. | |
| 7,003,289 B1 | 2/2006 | Kolls | |
| 7,050,606 B2 | 5/2006 | Paul et al. | |
| 7,085,710 B1 | 8/2006 | Beckert et al. | |
| 7,109,872 B2 | 9/2006 | Balaban et al. | |
| 7,126,485 B2 | 10/2006 | Cece et al. | |
| 7,126,583 B1 | 10/2006 | Breed | |
| 7,138,922 B2 | 11/2006 | Strumolo et al. | |
| 7,222,690 B2 * | 5/2007 | Isaji et al. | 180/272 |
| 7,292,152 B2 * | 11/2007 | Torkkola et al. | 340/576 |
| 7,652,583 B2 * | 1/2010 | Sanchez et al. | 340/575 |
| 2001/0033235 A1 | 10/2001 | Shinada | |
| 2002/0069071 A1 * | 6/2002 | Knockeart et al. | 704/275 |
| 2002/0091473 A1 | 7/2002 | Gardner et al. | |
| 2003/0011481 A1 | 1/2003 | Bjorkman | |
| 2004/0054452 A1 | 3/2004 | Bjorkman | |
| 2004/0088095 A1 | 5/2004 | Eberle et al. | |
| 2004/0143440 A1 | 7/2004 | Prasad et al. | |
| 2004/0234103 A1 | 11/2004 | Steffein | |
| 2004/0252027 A1 | 12/2004 | Torkkola et al. | |
| 2005/0002347 A1 | 1/2005 | Lee et al. | |
| 2005/0268320 A1 | 12/2005 | Smith | |
| 2006/0012679 A1 | 1/2006 | Ressler | |
| 2006/0047426 A1 | 3/2006 | Vitito | |
| 2006/0170689 A1 | 8/2006 | Maier et al. | |
| 2006/0171007 A1 * | 8/2006 | Chen et al. | 359/13 |
| 2006/0191177 A1 * | 8/2006 | Engel | 40/453 |
| 2006/0244632 A1 | 11/2006 | Corcoran | |
| 2007/0008083 A1 | 1/2007 | Berg et al. | |
| 2007/0024430 A1 | 2/2007 | Ling et al. | |
| 2008/0115654 A1 * | 5/2008 | Hanuschak | 84/602 |
| 2008/0291032 A1 * | 11/2008 | Prokhorov et al. | 340/576 |

FOREIGN PATENT DOCUMENTS

| | | |
|---|---|---|
| JP | 06270711 | 9/1994 |
| JP | 2006195637 | 7/2006 |
| WO | WO-0029083 | 5/2000 |
| WO | WO-0217787 | 3/2002 |
| WO | WO-02093829 | 11/2002 |

OTHER PUBLICATIONS

Scientific American Frontiers Program #1502 "Cars That Think." Airdate: Jan. 26, 2005. (Transcript).

* cited by examiner

SYSTEM AND METHOD FOR REDUCING BOREDOM WHILE DRIVING

FIELD OF THE INVENTION

The invention relates to systems and methods for reducing boredom, in particular for reducing boredom in drivers.

BACKGROUND OF THE INVENTION

Driver alertness is important to the safe operation of a vehicle. The dangers of driver tiredness are well recognized, and a number of systems have been developed to detect drowsiness in a driver. For example, the state of the driver can be monitored, and approaches used to wake up the driver if the driver is detected to have fallen asleep.

For example, U.S. Pat. No. 6,680,670 to Shinada describes an apparatus for a vehicle that includes a detector for the driver's state and physical condition. U.S. Pat. No. 6,014,081 to Kojima et al. describes an apparatus for a vehicle that prompts the driver to take a rest after a predetermined time or if an abnormal condition of the driver is detected. U.S. Pat. No. 5,923,256 to Satake et al. describes an apparatus to prevent a driver dozing including a sensor for eye closure duration. U.S. Pat. No. 6,950,027 to Banas describes an apparatus to detect a driver falling asleep, with a window being opened to rouse the driver in that case. These and other similar approaches generally relate to monitoring the physical condition of a driver, and providing a direct stimulus to rouse a driver from a sleepy state. However, if a driver is sleepy the best solution is probably for the driver to pull over to the side of the road and rest.

Conventional approaches fail to address a related but somewhat different condition of a driver suffering from boredom. A drowsy or sleepy driver is one that desires to sleep, regardless of the vehicle environment. A bored driver is typically one that has no particular desire to sleep, but minimal demands on their attention capacity lead to a feeling of boredom, which may develop into drowsiness even without a particular physiological need to sleep. Hence, boredom is a hazard to safe vehicle operation, and it would be extremely valuable from a safety perspective, at least, to develop systems and apparatus that can prevent boredom in a driver.

In other situations, a vehicle may be stopped, and the driver would welcome further intellectual stimulation. It would further be advantageous to provide systems and methods to prevent boredom in that situation.

SUMMARY OF THE INVENTION

Embodiments of the present invention include apparatus and methods for reducing driver boredom, particularly for driver in a vehicle environment that is unchallenging to the driver, and uses little of the attention capacity of the driver. An example system includes an electronic circuit such as a computer, a vehicle environment monitor, a driver interface, a driver stimulation device, and an optional source of entertainment data. In this example, the term "entertainment data" relates to data that can be used to assist the driver in avoiding boredom. Entertainment data may include media files such as photos, audio files, and the like. The source of entertainment data may be a wireless connection to a data network such as the Internet.

Software executed by the electronic circuit receives data from the vehicle environment monitor and determines if a risk of driver boredom exists. Data provided by the vehicle environment monitor may include the number of vehicles in the vehicle environment, and vehicle operation data (such as throttle position data, steering input data, brake operation data, cruise control operation data, and the like), GPS or other position sensor data, and the like. Vehicle operation data provides information on the vehicle environment. For example, driving for a prolonged period at a constant speed without a significant number of other vehicles is indicative of a vehicle environment conducive to driver boredom.

If the vehicle environment is determined to be conducive to driver boredom, the driver may be prompted to request assistance in avoiding boredom. For example a voice synthesizer may be used to ask the driver directly "Are you bored?" with an appropriate response leading to the use of the stimulation device to help the driver avoid boredom.

In some examples of the present invention, the stimulation device is a semi-transparent interactive display on which images can be displayed. The display may be substantially transparent when images are not displayed, and images can be overlaid on the driver's field of view using the display.

An audio system, including audio speakers, a microphone, and speech recognition capability, may be used as a driver interface. The driver may be asked questions using synthesized speech, and answers interpreted using the speech recognition capability. In some examples, the responses may be constrained by the form of the question, for example requiring a yes/no answer or multiple choice response, simplifying the speech recognition requirements.

The driver interface may include a tactile interface, for example including one or more keys. In some examples, the driver interface may be part of the psychological stimulation required to avoid boredom.

In an example method according to an embodiment of the present invention, the vehicle environment is monitored to determine if a risk of driver boredom exists. If this risk exists for a predetermined time, for example a number of minutes, the driver is asked if they wish to receive assistance from the system. An affirmative response may lead to visual and/or auditory stimulation, as further described elsewhere in the specification. The stimulation provides psychological stimulation, to assist a person who may not be tired to avoid boredom-induced drowsiness. The system will be disabled in the event of hazardous driving conditions occurring, as determined using the vehicle environment monitor. Alternatively, the driver may halt the performance of the system at any time.

Examples of the present invention help avoiding driver boredom, where driver boredom is not necessarily a drowsy state or a physiological need for sleep. Previous approaches have provided direct physical stimuli to a driver determined to be at risk or actually asleep. However, there are many cases where a minor psychological stimulus can be used to rouse a driver from a state of inattention that is largely caused through an absence of stimuli from the driving environment. In particular, driving along straight roads at constant speeds, driving at night, driving in rural conditions with few other vehicles, or other possibly easy driving environments can lead to driver boredom.

Previous approaches have required monitoring of a driver's physiological state to determine a likelihood that the driver is asleep or drowsy. However, in embodiments of the present invention, a risk of boredom can be determined from the driver environment, in particular the vehicle environment. It may not be necessary to monitor the physiological state of the driver at all.

Other embodiments of the present invention are useful for the entertainment of a driver of a stopped vehicle, where visual and/or auditory stimulation can be provided without risk of distracting the driver.

An example apparatus for reducing driver boredom comprises a vehicle environment monitor, operable to provide environment data representative of the vehicle environment such as a traffic sensor operable to sense other vehicles in the vehicle environment, an electronic circuit receiving the environment data and operable to determine if there is a likelihood of driver boredom using the environment data, and a driver stimulation device, operable to provide psychological stimulation to the driver if there is a likelihood of driver boredom. A driver interface can be used to query the driver as to the existence of driver boredom and to receive a response, and may include a speech synthesizer and a microphone, the electronic circuit using a voice recognition algorithm to determine if the response indicates driver boredom. Environment data may include vehicle operation data, such as throttle position data, steering input data, cruise control status, brake operation data, and the like. A likelihood of driver boredom can be determined from a lack of variation (e.g. Substantially constant) for one or more type of vehicle operation data. A driver stimulation device may be a visual display within the field of view, such as a semitransparent, display through which the driver views the vehicle environment.

A representative process for reducing driver boredom includes monitoring the vehicle environment, determining if there is a likelihood of driver boredom from the vehicle environment, querying the driver to determine if driver boredom exists, and providing psychological stimulation to the driver if driver boredom exists, so as to reduce the driver boredom. The psychological stimulation may include displaying one or more images to the driver.

DETAILED DESCRIPTION OF THE PREFERRED EMBODIMENTS

A vehicle driver (or the operator of any machine) is likely to be bored when subjected to monotonous environment, such as when there is simply not much to pay attention to. For example, driving alone at night along a deserted, straight, and level highway requires such a small fraction of the driver's attention capability that boredom is likely.

Embodiments of the present invention reduce driver boredom by influencing various sensory channels of a human driver, such as vision and/or hearing. Available visual or aural capacity (in excess of that necessary to drive safely) can be used to reduce boredom. For example, available visual capacity is likely during night driving.

In one embodiment, the driver's field of view includes a display. Example displays include projection displays (for example, projection onto the inside of the windshield, goggles, pop-up displays and the like. For example, the driver may view the road through a semi-transparent interactive display with images controlled by a computer. When no images are presented, the driver's field of view is unimpeded.

An electronic circuit, such as a computer within the vehicle, can be used to implement display control software. An example system continuously monitors the vehicle environment to determine if the driving environment is easy for the driver to handle. For example, an extended period of easy driving environment is likely to induce boredom. At night, such an environment may be characterized by a lack of vehicles on the road, or a single vehicle far away from the driver's vehicle. The identification of a boredom-inducing environment or the measurement of the state of boredom may be used as a trigger to activate psychological stimulation of the driver. The driver may also be monitored for signs of boredom, for example using one or more physiological sensors, or monitoring audible (or otherwise detectable) indications of boredom such as deep breathing, yawns, sighs, and the like.

Detection of likely driver boredom may then be used as an override able trigger for the psychological stimulation. When it is determined that an easy vehicle environment has persisted for a predetermined time, such as few minutes, or a driver monitor has determined that the driver is likely to be bored (and possibly at risk for drowsiness), the system then assists the driver to reduce boredom. For example, the system asks the driver "Are you bored?" When an affirmative answer is obtained (speech recognition or key entry may be used), the system enables operation of a stimulation device, such as a display. In other examples, the stimulation device operation may begin without obtaining an affirmative answer through an initial interaction with the driver.

In a representative example, when a computerized system determines that the driver is probably bored, it offers the driver visual and auditory stimuli in an interactive way intended to reduce boredom. The stimuli help prevent a boring activity from inducing drowsiness. Psychological stimulation may be provided, for example using images and audio signals. Direct engagement at a psychological level using appropriate visual and auditory stimulations are expected to activate more of the brain than a sensory stimulation alone.

Psychological stimulation may include card games, other simple games that can be performed by the driver without significant distraction from the vehicle environment, communication with other vehicles or other people over an Internet connection, reading of books, jokes, comedy routines, or other psychological stimulation calculated to engage the emotions of the driver. In general, it may be determined that emotional engagement is a highly effective way of reducing driver boredom.

Figure 1:
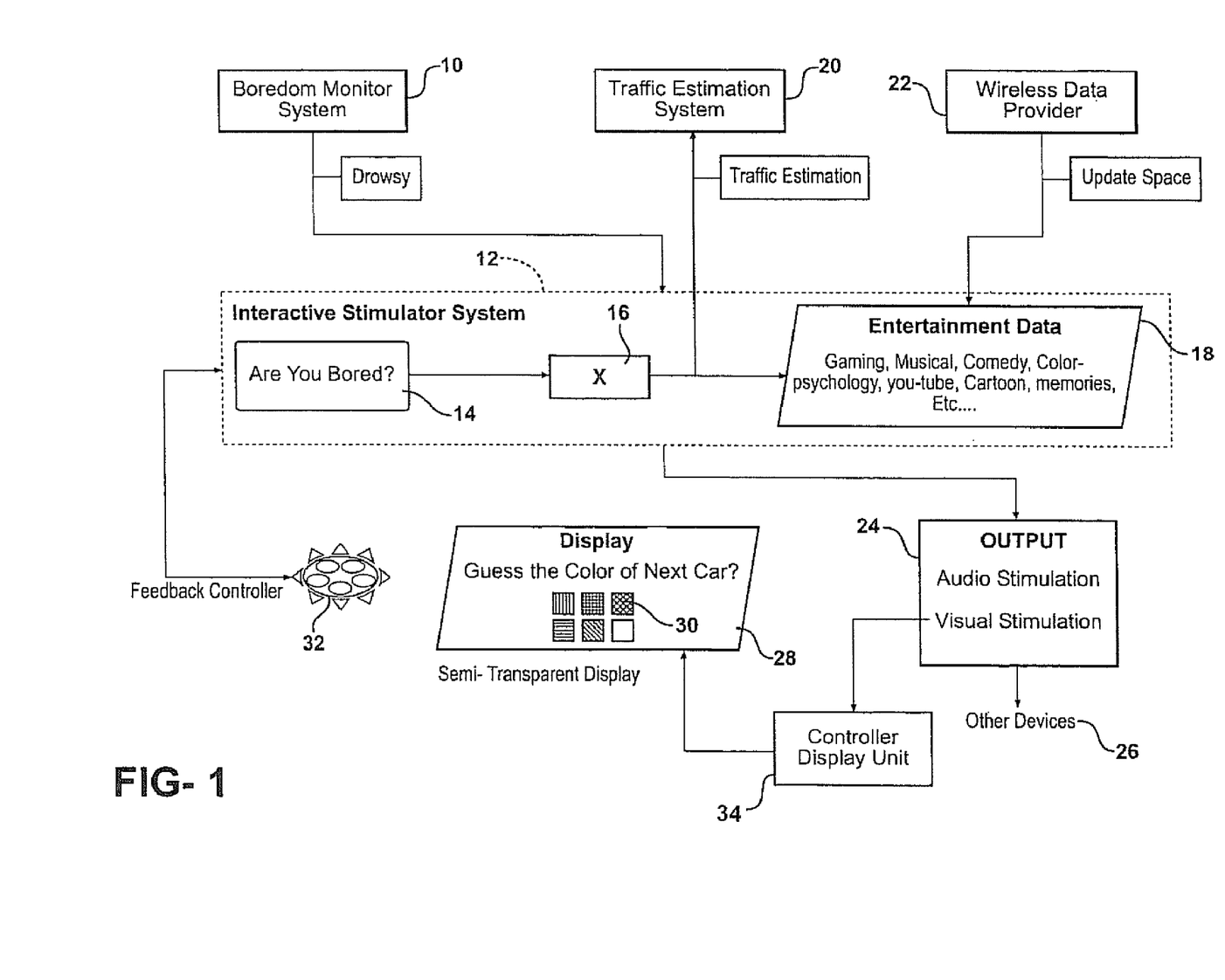
FIG. 1 illustrates a system according to an embodiment of the present invention, including a driver boredom monitor and an interactive driver stimulator.

FIG. 1 illustrates a system according to the present invention. The system includes a boredom monitor system 10, an electronic circuit 12 operating as an interactive driver stimulator, a driver interface 14 operable to query the driver, a processor 16, a memory for entertainment data 18, a traffic estimation system 20 comprising a sensor for other vehicles, a wireless data provider 22, audio and visual stimulation device drivers 24, other devices 26, a semitransparent display 28, a graphic shown by the display 30, a feedback controller 32 and a display controller 34. In one example, the boredom monitor system is used to determine a risk of driver boredom.

The traffic estimation system monitors external vehicular traffic, and may in fact be used as part of the boredom monitor system. For example heavy external traffic conditions generally are inconsistent with driver boredom. The electronic circuit 12 is used to interact with the driver, for example using simple questions as indicated at 14 and, depending on the response, provide entertainment to the driver from entertainment data storage 18. As shown in this example, entertainment data may be obtained over a wireless communications link from a wireless data provider. The device output, indicated generally at 24, may include audio stimulation, visual stimulation, or other form of psychological stimulation. In this example, a semi-transparent display 28 is used to provide visual stimulation. The graphic 30 is used as a question to the driver to guess the color of the next car seen. Other simple interactions may also be facilitated by use of graphics on a semi-transparent display. The feedback controller 32 includes one or more keys or other tactile interface, and is used by the driver to respond to simple questions as illustrated at 14. The display controller 34 is used to control the display 28.

Figure 2:
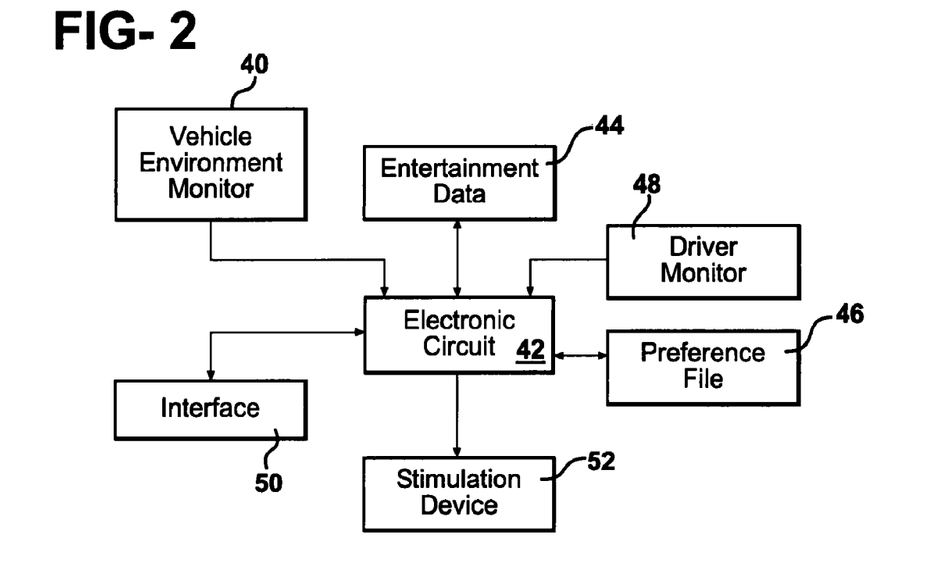
FIG. 2 is a further schematic of a system to reduce driver boredom.

FIG. 2 is a further schematic of a system according to an embodiment of the present invention, comprising vehicle environment monitor 40, electronic circuit 42, entertainment data source 44, preference file 46, driver monitor 48, driver interface 50, and stimulation device 52. In this example, the vehicle environment monitor may comprise vehicle operation sensors and sensors for other vehicles in the driving environment. The entertainment data source may comprise a wireless communications link. The preference file 46 may include known or inferred driver preferences. These may include previous selections, responses to questionnaires, or other sources of driver preferences. The dialog interface may comprise a microphone, keypad, or other mechanism by which the driver can respond to questions or stimulations. The driver monitor may comprise a microphone or other driver attitude (e.g. Position or posture) sensor. The stimulation device may comprise a semitransparent display as discussed in relation to FIG. 1 above.

Entertainment Data

Entertainment data may include video clips, for example from You tube or other Internet sources, audio files that may includes news, humor, entertainment, and the like, web pages, logs, vlogs, or other data sources. Systems according to the present invention may have the capability to convert text data into speech, so that the driver does not have to take attention from the road to read text material.

In some examples, data may be compressed or summarized, for example using song snippets, partial news reports, and the like to provide a faster moving entertainment than an unmodified data source. In some examples, a communications link to a live person, such as a telephone operator, may be provided so that the stimulation data can be provided from a remote source.

Figure 3:
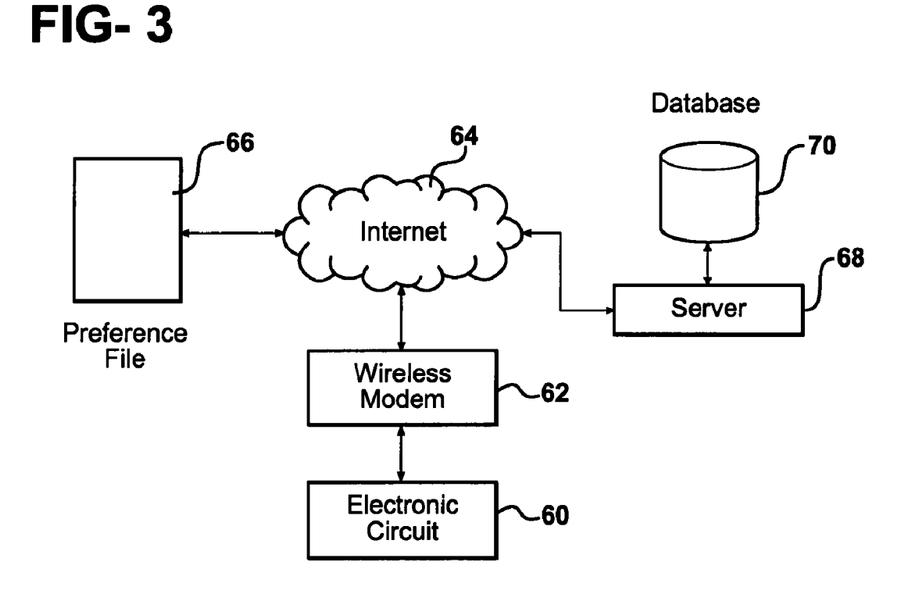
FIG. 3 is a schematic showing a possible configuration for entertainment data sources.

FIG. 3 shows a possible configuration for an entertainment data source. The configuration uses a wireless modem 62 to connect vehicle electronic circuit 60 to the Internet 64. One or more servers 68 also connected to the Internet provide access to a database of entertainment data 70. An optional driver preference file 66 is also accessible. The preference file, as discussed above in relation to element 46, may be stored locally on the vehicle or at a remote location.

Boredom Monitor

A boredom monitor system preferably includes a vehicle environment monitor. The vehicle environment monitor may comprise a sensor receiving inputs from the vehicle control systems, and further from vehicle sensors for other vehicles on the road proximate to the vehicle (traffic). For example, the vehicle environment monitor may receive a speed input from a speed sensor, steering control input data from a steering sensor, GPS data from a navigation system, a time from a last stop from a clock or timer (for example from the last time that the park gear was engaged), a total time of driving for a particular trip, altitude variations from an altimeter, a time since a last interaction with a system according to the present example, a passenger seat monitor to determine if the driver is driving alone, cruise control data from a cruise control, time data (to indicate night driving), external ambient lighting sensor, or other data from one or more other vehicle systems.

For example, if a person drives at a constant speed, for example using the cruise control set, for thirty minutes an initial driver interaction may be triggered. Other examples where boredom may be determined include night driving (determined from a clock or ambient light sensor), driving within rural areas as indicated by the GPS, driving in flat areas as determined using an altimeter (which may be a GPS), or other indications of significant driving monotony. The lack of driver inputs, such as brake pedal operation, gas pedal operation, steering inputs, speed changes, and the like over a prolonged period, such as thirty minutes or one hour for example, may be used to indicate a monotonous driving environment that puts the driver at risk of boredom. Vehicle operation data, such as speed, cruise control engagement, and the like may be provided by preexisting sensors, and may be provided by a vehicle computer. The time before an initial interaction with the driver may be predetermined, for example stored within a preference file.

In some examples, driver behavior may be monitored for indications of boredom. Indications of boredom detected by a driver monitor may include noises, such as yawning or muttering, repeated channel changes on the radio, tuning the radio to an AM station, and the like. Hence, a driver monitor may include a microphone within the vehicle, and may receive signals from electronic devices within the vehicle.

Figure 4:
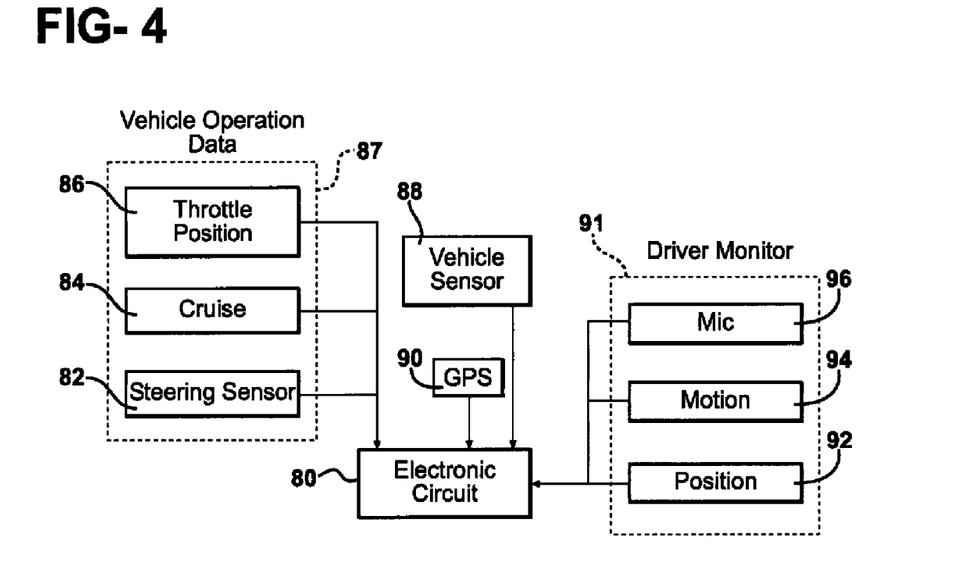
FIG. 4 is a schematic showing a possible configuration for a vehicle environment monitor.

FIG. 4 shows a possible configuration for determining a likelihood of driver boredom, in this example including a vehicle environment monitor and a driver monitor. In this example the electronic circuit 80 receives signals from the steering sensor 82, cruise control 84, accelerator position sensor 86 (these first three sensors providing a source of vehicle operation data 87), other vehicle sensor (traffic sensor) 88, and GPS device 90. These sensors provide an indication of the vehicle environment, and the collected environment data can be used to determine a likelihood of driver boredom even without monitoring the driver. However, the electronic circuit may also receive sensor data related to the condition of the driver from a driver monitor. In this example, the sensors of the driver monitor 91 include microphone 96, driver position sensor 92 (for example to detect slouched or slumped positions), and driver motion sensor 94. In some embodiments of the present invention, only vehicle operation data and external environmental parameters such as geographical position, traffic, and time of day are used to determine a risk of boredom of the driver. However, in further examples, these data may be supplemented with data related to the condition of the driver. The electronic circuit 80 determines a likelihood of boredom from collected data, and may include an artificial intelligence (AI) capability to learn, for example comparing the responses to a query "Are you bored" to preexisting vehicle environments.

System Interaction with Driver

If the system determines a boredom risk exists, an initial interaction with the driver is triggered. For example this may be a question such as "Are you bored?" In other examples a light, other visual indicator, noise such as a beep, or other interaction with the driver can be used. The purpose of the initial interaction is to determine if the driver wants to engage with the system. In some examples, even if there is a significantly monotonous driving environment, a driver may decline to interact with the system during the initial interaction. In such examples, a further waiting period may expire before a second interaction is triggered. The lockout period may increase with successive rejections.

If the initial interaction indicates a desire for the driver to interact with the system, a number of approaches may be used. For example the driver may be presented with visual stimulation, as further described below. The driver may be presented with a menu of options from which to choose, which may include visual stimulation, auditory stimulation, or some combination of psychological stimulations. Voice recognition software can be used to determine which selection the driver has made, and also in triggering the initial interaction. For example if a driver says "Darn, I'm bored," the system may recognize this and initiate the interaction.

The driver interface can be combined or used with other interface components of other devices, for example buttons or other interfaces within the vehicle, to enhance interaction with the driver. For example if another vehicle system is deactivated, buttons on that system may have a second function in relation to operation of a boredom reduction system. Questions may be displayed on a visual display, and answers received through a voice recognition system. Other combinations will be obvious to those skilled in the art. Stimulation data, such as entertainment data, images, noises, and the like may be obtained from one or more stimulation data sources. These may include one or more of the following: an internal memory, a memory card, CD/DVD player, wireless data provider such as a wireless communication link to the Internet, cell phone link, satellite link, or other communication link or data storage device. Data may be downloaded over a wireless communication link before it is needed, for example if connections to the Internet are unreliable in a rural area.

The system may be able to understand the driver's spoken feedback. A subset of options might be pre-selected, which facilitates speech recognition of driver response. An example system may communicate with various databases and/or have substantial search capabilities, in response to driver responses to the system. A database can be dynamically extended, e.g., by fetching the missing images/audio files from the Internet. A database is likely to be hierarchical, e.g., the category "people" includes "men", "women", and "children". Simple games, such as 20 questions, can be played, for example the driver being asked about an image in mind.

The driver-system dialogue may also be implemented as textual or spoken (output) and tactile (input) interfaces. In one example, the driver is presented with a textual question on the display mentioned above. The driver then chooses the answer by pressing buttons in a suitable location. The buttons could even be hidden under a known area (e.g., a portion of the driver door panel). To make a choice, the driver has to find the button location by moving fingers across the area. This could be a 2D array of buttons, where one of the buttons is enabled at random, and one of them is to be pushed to answer the question. Engaging the driver in a simple additional activity (answering questions, moving fingers to find buttons) may be effective in reducing boredom.

Figure 5:
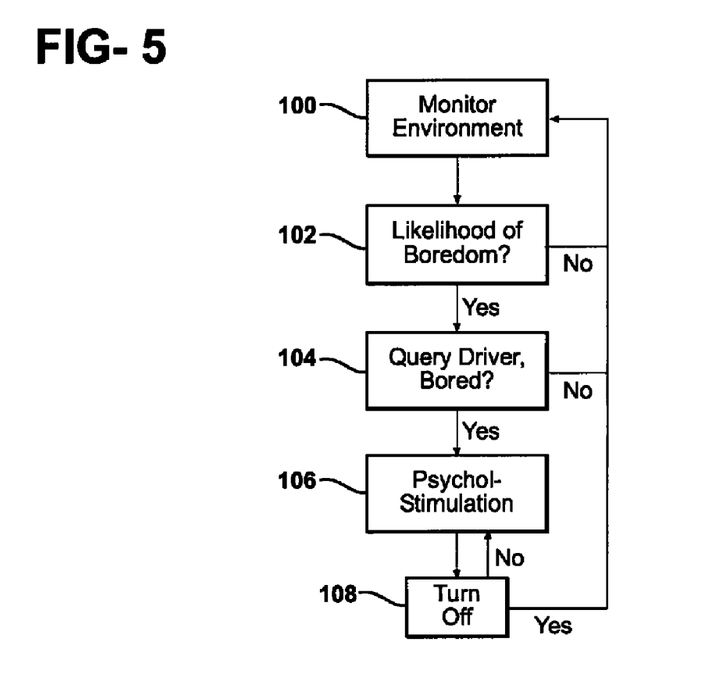
FIG. 5 illustrates a method according to an embodiment of the present invention.

FIG. 5 illustrates a process according to an embodiment of the present invention. In this example, the process includes monitoring the vehicle environment (100), determining if the vehicle environment provides a risk of driver boredom (102), and initiating contact with the driver through a query, equivalent to "Are you bored?" (104). If the driver requests further interaction with the system as indicated as "Yes" to the query, the system implements methods of reducing boredom, such as psychological stimulation (106). A "yes" response to a turn off query (108) corresponds to receiving a signal to turn off the system, which may come from the driver or from a change in the external vehicle environment.

Visual Stimulation

Visual stimulations may include changing the appearance of the driver's field of view, for example using a semi-transparent display positioned between the driver's eyes and the external environment. The semi-transparent display may be provided by a windshield assembly (such as a display embedded within the vehicle windshield), a pop-up display such as a liquid crystal display that rises from the dashboard, goggles worn by the driver, or other system. In other examples, light may be projected onto the windshield, providing visual stimulation that is superimposed on the field of view. Phosphors may be embedded within the windshield glass, that are excited electrically or by an external beam of radiation. Auxiliary devices, such as a video camera, can be used to provide video data that can be used to enhance the driver's view.

For example, a night vision system may include a video camera providing video data converted to an image projected onto the windshield. In other embodiments, a false-color display may be projected. This assists the driver with nighttime driving, and also the extra visual stimulation assists the driver to reduce boredom. In other examples, audio stimulation can be used. An audio system within the vehicle, for example including one or more speakers, a voice synthesizer, a microphone, and a voice recognition system, can be used to engage the driver in questions and answers, game playing, or other activity. The audio system can also be used as the driver interface, where the driver may be asked questions concerning the operation of the system, for example preferences or other desires.

Using a semi-transparent display, the road, other vehicles (if present on the road), and surroundings may be colored brightly to attract the driver's attention. Colors can be constantly changing, in some cases without repeating their order. Unpredictable, or random, visual effects may be more psychologically stimulating.

The vehicle may be equipped with sensors for detecting vehicles located in front of the vehicle, for example in the range of tens to hundreds of meters. In addition, a sensor may be able to separate the road from its surrounding, for example using existing lane tracking sensors.

The field of view may also include with less straightforward "attention attractors", such as pictures, photographs and audio tracks. The system may engage the driver in a dialogue trying to determine what images are the most suitable to the driver, e.g., "What images are pleasant to you?", or "What persons are causing you most anxiety?"

Showing a picture in the driver's field of view may dramatically change the person's mood, which may help to reduce boredom. Optionally, images may be able to activate cognitive or limbic systems in the driver to leverage the provided psychological stimulation to generate physiological arousal, such as images of the people of the driver's preferred gender.

Figure 6:
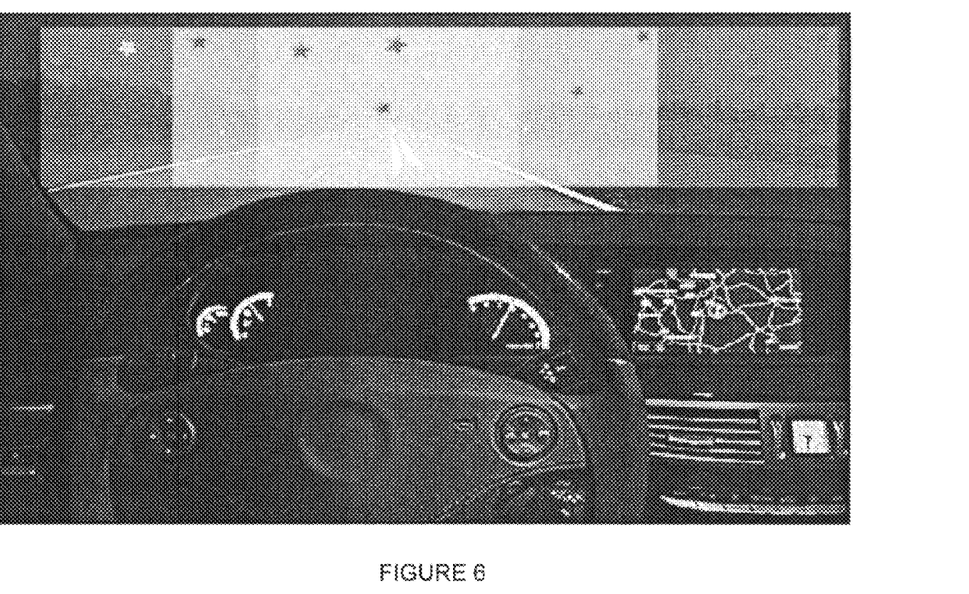
FIG. 6 shows visual stimulation using artificial objects in the field of view.

FIG. 6 illustrates one type of visual stimulation, comprising the display of artificial objects in the field of view.

Figure 7:
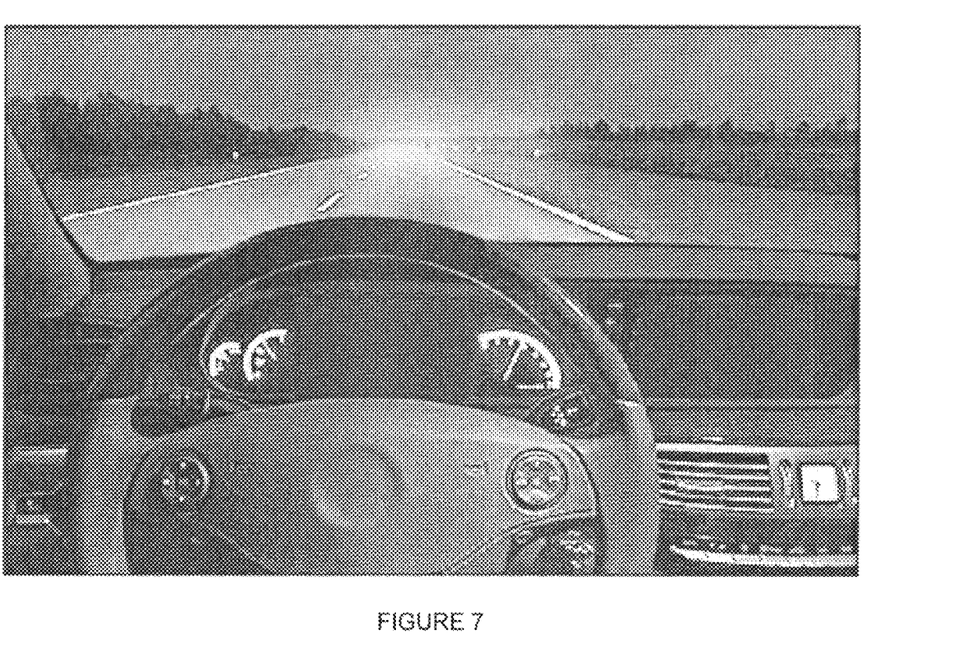
FIG. 7 shows visual stimulation by artificial coloring of the field of view.

FIG. 7 illustrates a further example of visual stimulation, in this case an artificial coloring of the road as it appears to the driver.

Figure 8:
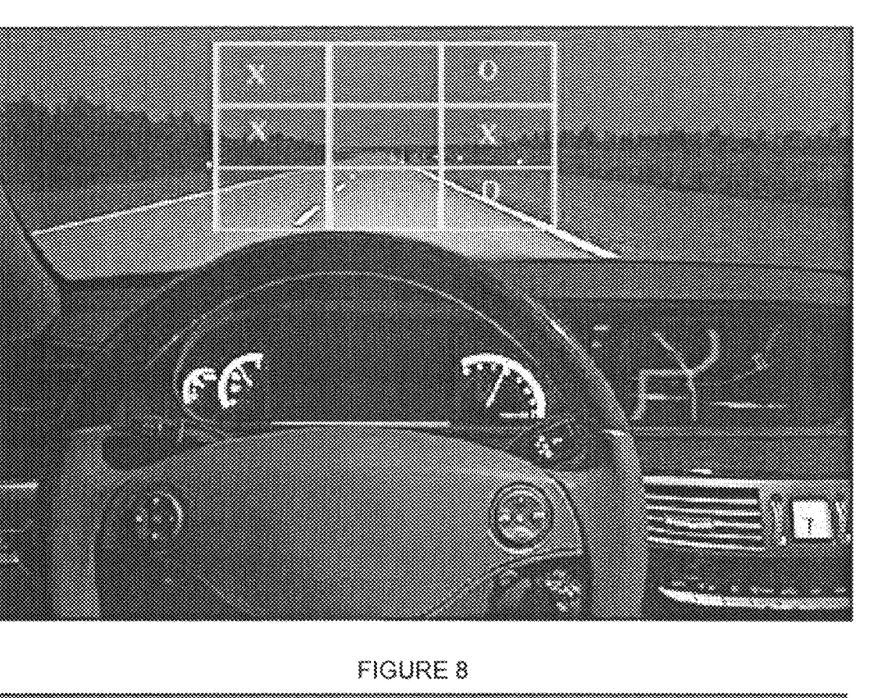
FIG. 8 shows boredom prevention using a simple game.

FIG. 8 illustrates providing a mildly engaging game within the field of view, in this example tic-tac-toe.

Figure 9:
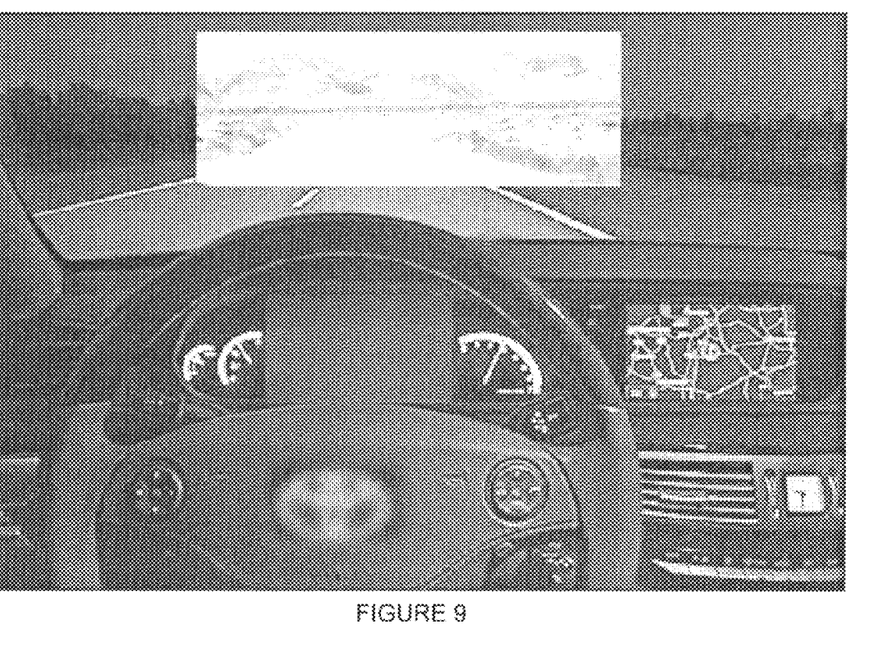
FIG. 9 shows boredom prevention using an enhanced view of the road, in this example a thermal image.

FIG. 9 illustrates a superimposition of an enhanced day view on the existing night view of the road. In this case, signals from a video sensor may be used to generate a projected image which enhances the view.

Images may chosen by driver, for example using the dialogue module discussed above. Images can be placed in the sky area of the display, or superimposed on other vehicles. Other possible examples of displayed images include laterally moving false vehicles at the edge of the road, preferably far away from the driver's vehicle, torpedoes launched toward false vehicles (the displayed trajectory may be computer controlled), brief events (e.g., fireworks emanating from vehicles, color contours disappearing at random moments), crucial navigational information and vehicle warnings (e.g., warn about the next exit, low fuel, etc.; only warnings and relevant information should be displayed), artificially add vehicle-like or other dynamic or static obstacles to the display to increase the perceived difficulty of the driving environment.

Visual stimulation can be interrupted immediately if the road situation changes, as detected by a vehicle environment monitor. For example, the display can be turned off if there is sudden heavy traffic. The driver can do so manually, or the software can do so automatically.

Hence, systems and methods according to the present invention can help reduce boredom in a driver. Such boredom typically arises from a monotonous driving environment, leading to a risk of attention lapse and possible drowsiness or sleep. Drowsiness may arise even though the driver has no physiological need for sleep, and can be avoided by reducing boredom.

A vehicle environment monitor can be configured to detect a monotonous driving environment, such as one which requires little activity or attention by the driver, such as an open road. Embodiments of the present invention allow the driver to avoid drowsiness. Conventional techniques may detect drowsiness in a driver, however it is preferable to stimulate the driver psychologically before the need for a physical stimulus is required to arouse an actual drowsy driver.

Systems and processes according to the present invention can be combined with separate or integrated systems to prevent drowsiness, and systems to wake up a driver showing signs of sleep.

Systems may provide random entertainment, and may also be configured to learn the preferences of the driver. The system may be self-monitoring, for example monitoring its own effectiveness through changes in the response time of the driver. In this case the system measures a physical response time, and correlates this with the effectiveness of the previous psychological stimulation.

One or more displays can be used to provide visual stimulation. These may be transparent displays or images projected onto the inside of the windshield. A separate display may also be used, for example one within the dashboard or rising from it when in use. The display used for the navigation system may also be used for visual stimulation.

In examples of the present invention digital images can be manipulated and used to enhance the visual field of view of the driver. The system can be used to engage the driver in one or more games, quizzes, educational material, and the like.

A tactile interface can be used as a means to engage the driver. The primary purpose is one of psychological stimulation and not of physical stimulation though such systems may be combined with embodiments of the present invention.

Other systems may be engaged in the case of actual drowsiness, such as a physiological need for the driver to sleep. However, embodiments of the present invention provide psychological stimulation at an earlier stage, and allow drowsiness to be avoided entirely.

A switch may be provided by which the driver can deactivate any system rapidly, for example due to a change in the driving environment. This may be a sudden or unexpected hazard. External vehicle sensors may also be used to deactivate the system, for example in the case of numerous vehicles in the environment of the driver's vehicle.

In other applications, systems may be used to enhance productivity in any circumstance by monitoring the lack of stimulation of a person. The person may be interrupted from a task and provided with psychological stimulation. Such stimulation acts to increase overall productivity. For example, if a person has been working at a word processor for a certain period of time without any variety of stimulating input, a computer may break in and provide some degree of psychological stimulation. This is particularly useful for the creative use of word processors for example.

Systems and methods according to the present invention can also be used for operators of other vehicles such as trains and airplanes, operators of equipment, security personnel, or anyone in a potentially monotonous situation.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Having described our invention, we claim:

1. An apparatus for reducing driver boredom in a driver of a vehicle, the vehicle having a vehicle environment, the apparatus comprising:
   a vehicle environment monitor, operable to provide environment data representative of the vehicle environment, the vehicle environment monitor including a traffic sensor operable to sense other vehicles in the vehicle environment;
   an electronic circuit, receiving the environment data from the vehicle environment monitor, and operable to determine if there is a likelihood of driver boredom from the environment data,
   an absence of other vehicles in the vehicle environment being indicative of the likelihood of driver boredom,
   the environment data further including vehicle operation data, the electronic circuit being operable to determine the likelihood of driver boredom using the vehicle operation data,
   substantially constant vehicle operation data over a predetermined time period being further indicative of the likelihood of driver boredom, the predetermined time period being at least thirty minutes,
   said circuit generating a signal when there is the likelihood of driver boredom;
   an interactive communication device, said device querying the driver as to whether the driver is bored upon receiving the signal from the electronic circuit; said interactive device receiving a response from the driver regarding whether the driver is bored; and
   a driver stimulation device, operable to provide psychological stimulation to the driver if the driver responds that the driver is bored.

2. The apparatus of claim 1, the driver interface including a speech synthesizer and a microphone, the electronic circuit using a voice recognition algorithm to determine the response.

3. The apparatus of claim 1, the vehicle operation data being selected from a group consisting of throttle position data, steering input data, cruise control status, and brake operation data.

4. The apparatus of claim 1, the driver having a field of view, the driver stimulation device including a visual display within the field of view.

5. The apparatus of claim 4, wherein the visual display is semitransparent, the driver viewing the vehicle environment through the visual display.

6. The apparatus of claim 4, wherein the visual display is a projection display.

7. A process for reducing driver boredom of a driver of a vehicle, the vehicle having a vehicle environment, the process comprising:
   monitoring the vehicle environment, including monitoring vehicle operation data;
   determining if there is a likelihood of driver boredom from a lack of stimulation in the vehicle environment, substantially constant vehicle operation data over a predetermined prolonged time period being indicative of the lack of stimulation in the vehicle environment;
   querying the driver for a response as to whether the driver is bored or not bored, if the likelihood of driver boredom is determined;
   receiving a response from the driver as to whether the driver is bored or not bored; and
   providing psychological stimulation to the driver in accordance to the response from the driver that the driver is bored, so as to reduce the driver boredom.

8. The process of claim 7, wherein monitoring the vehicle environment includes detecting other vehicles in the vehicle environment,
   an absence of other vehicles in the vehicle environment for a predetermined time period being indicative of the likelihood of driver boredom.

9. The process of claim 7, wherein psychological stimulation includes displaying images to the driver.

10. The process of claim 7, wherein the predetermined prolonged time period is at least 30 minutes.

* * * * *

UNITED STATES PATENT AND TRADEMARK OFFICE
CERTIFICATE OF CORRECTION

| | | |
|---|---|---|
| PATENT NO. | : 7,982,620 B2 | Page 1 of 1 |
| APPLICATION NO. | : 11/752336 | |
| DATED | : July 19, 2011 | |
| INVENTOR(S) | : Danil V. Prokhorov et al. | |

It is certified that error appears in the above-identified patent and that said Letters Patent is hereby corrected as shown below:

Title Page, item 57 Abstract, line 3 insert --,-- after "vehicle" (1st occurrence)
Column 3, line 19 - delete "Substantially" and insert --substantially--
Column 4, line 27 - delete "override able" and insert --overrideable--
Column 5, line 36 - delete "Position" and insert --position--
Column 5, line 41 - delete "You tube" and insert --YouTube--
Column 5, line 43 - delete "logs" and insert --blogs--

Signed and Sealed this
First Day of May, 2012

David J. Kappos
*Director of the United States Patent and Trademark Office*